Figure 1:
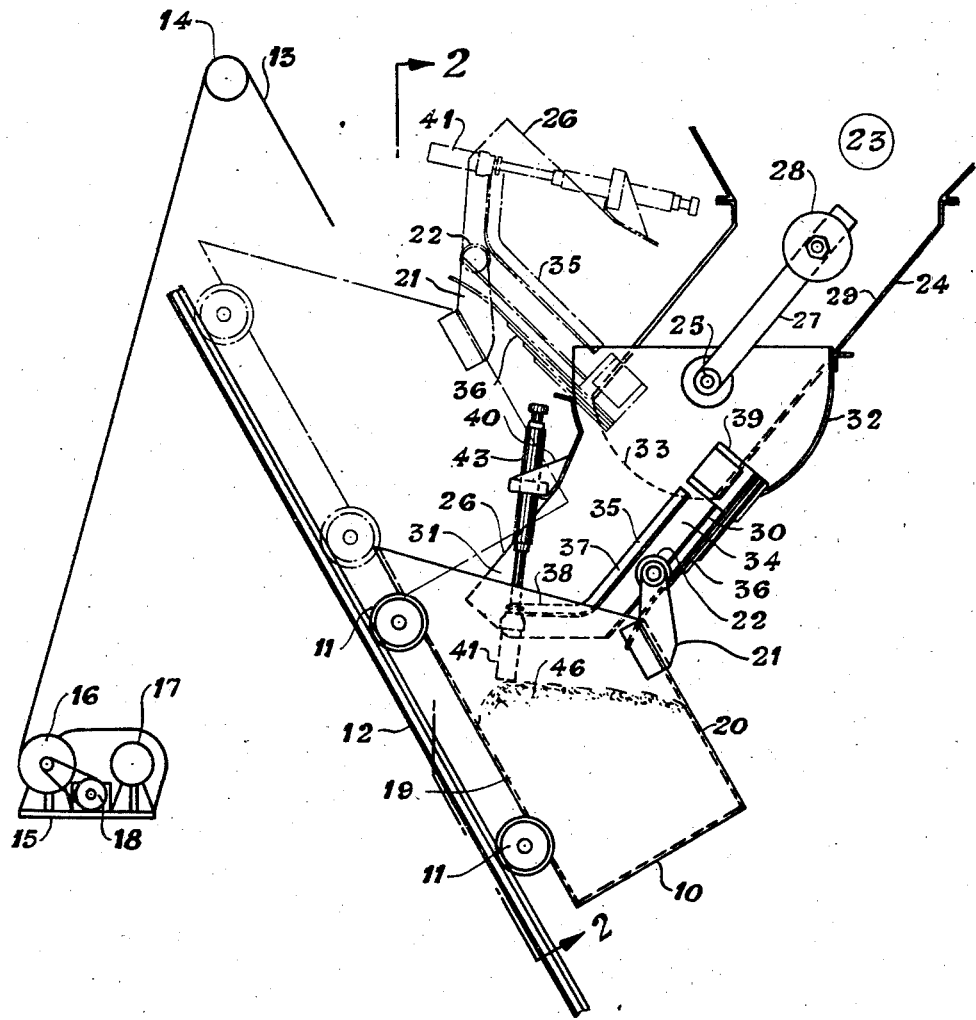

Feb. 4, 1947.   A. J. WHITCOMB   2,415,199
VOLUME MEASURING MEANS FOR SKIP LOADING
Filed June 30, 1945   2 Sheets-Sheet 1

INVENTOR.
Arthur J. Whitcomb
BY
Wilkinson Huxley Byron + Knight
Attys.

Patented Feb. 4, 1947

2,415,199

UNITED STATES PATENT OFFICE 2,415,199

VOLUME MEASURING MEANS FOR SKIP LOADING

Arthur J. Whitcomb, Chicago, Ill., assignor to Freyn Engineering Company, Chicago, Ill., a corporation of Maine Application June 30, 1945, Serial No. 602,459

4 Claims. (Cl. 214—125)

The present invention relates to improvements in volume measuring means for skip loading.

More particularly the present invention relates to improvements in measuring means applicable to skips for handling coke breeze or the like, such as are used in connection with blast furnaces. It is common practice to provide a skip riding upon an inclined track, said skip traveling between a skip pit and an overhead storage bin.

The lower limit of movement of the skip is determined under usual circumstances by a limit switch and a brake controlling the motor which operates the skip. Due to stretch of the cable or variations in the brake, the lower limit of movement of the skip may vary through several inches. The present invention provides mechanism for measuring the volume of material within a skip regardless of variations, within limits, of the position of the skip at its lower limit of movement.

The present invention involves the use of electrode means adapted to be contacted by the material loaded in the skip. For this reason the present invention is particularly applicable to the measurement of materials which are conductors of electricity.

An object of the present invention is to provide improved volume measuring means adapted for measuring the volume of electrically conductive material disposed within a skip.

A further object is to provide volume measuring means of the kind just referred to which is operable regardless of variations, within limits, of the position of the skip.

A further object is to provide volume measuring means applicable to a skip of a skip hoist mechanism, which measuring means involves electrode means movable in response to movements of a delivery chute, which in turn is positioned in response to the position of the skip.

A further object is to provide volume measuring means well adapted to meet the needs of commercial service.

Further objects will appear as the description proceeds.

Referring to the drawings—

Figure 2:
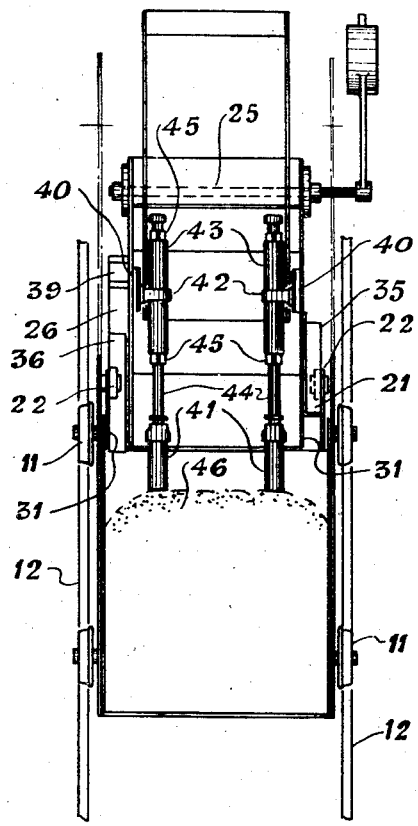

Figure 1 is a view in sectional elevation illustrating one embodiment of the present invention; and Figure 2 is a view taken along the planes indicated by the arrows 2—2 of Figure 1.

The numeral 10 indicates a skip having wheels 11—11 engaging the inclined track 12. That skip is illustrated in material receiving position in the skip pit. The skip 10 is connected through a bail or the like (not illustrated) to the cable 13 which passes over a sheave 14. The numeral 15 indicates a hoist including the driving drum 16, which may be operated through power transmitting mechanism (not illustrated) by the motor 17. A limit switch 18 may be connected to the drum 16 for determining the position at which the motor shall stop at the two limits of its operation.

As shown in Figure 1, the skip 10 has a long side wall 19 adjacent to the track 12 and a shorter side wall 20 spaced from said track 12. Disposed adjacent to the short side wall 20 are a pair of brackets 21—21, said brackets being located at the two opposite sides of the skip 10, that is—on the near side and the far side as the parts are viewed in Figure 1. Each of said brackets 21—21 at its outer extremity is provided with a guide wheel 22. It may be explained at this point that the bracket 21 is not illustrated in the left-hand side of Figure 2, the illustration being omitted to clarify the illustration of members to be described presently with which the guide wheels 22—22 cooperate.

The numeral 23 indicates a bin having an opening in the bottom thereof for the delivery of material to the chute 24. Extending transversely of the chute 24 is the shaft 25. Said shaft 25 is rotatable and serves as a mounting means for a rotatable extension chute 26, said rotatable extension chute 26 being counterweighted by the lever 27 carrying the counterweight 28. The chute 24 has the slanting bottom wall 29 and the extension chute 26 has the wall 30 adapted to be positioned in approximate alignment with the wall 29. Said extension chute 26 is provided with the two side walls 31—31, which, together with the bottom wall 30, provide guide means for material delivered from the chute 24. Said extension chute is adapted to direct material into the skip 10 when said skip is in position for receiving material. Said extension chute 26 includes the shut-off gate 32, which is of arcuate form to conform to similarly shaped ends 33 of the side walls of the chute 24. Said extension 26 is adapted to be swung about the axis of the shaft 25 into the position indicated in broken lines in Figure 1.

The skip 10 in its movements up and down the track 12 is adapted to swing the extension chute 26 up to its dotted line position when said skip is moved upwardly and to swing the extension chute downwardly when the skip 10 is moved downwardly. For this purpose the extension chute 26, exteriorly of the two side walls 31—31, is provided with a pair of sets of guide members, one of which is illustrated in Figure 1 and indicated as a whole by the numeral 34. Each set of guide members 34 is made up of an angle iron 35 (secured exteriorly of the corresponding side wall 31) and the leaf spring member 36 (one end of which is secured to the corresponding side wall 31 of the extension chute 26). Said angle iron 35 has a portion 37 extending substantially parallel with the bottom wall 30 of the extension chute 26, and an upturned portion 38. The leaf spring 36 is made up of a plurality of laminations, the uppermost one being turned downwardly at its outer extremity, whereby to provide a flared opening for receiving the wheel 22 carried by the corresponding bracket 21 secured to the skip 10. The leaf spring 36 is secured to the chute 24 by means of the bracket 39.

Referring to Figure 2, a leaf spring 36, its mounting bracket 39 and the associated guide wheel 22 are illustrated at the left side of the figure, but the showing of the corresponding angle iron 35 and guide wheel bracket 21 is omitted. At the right side of Figure 2 a wheel bracket 21, the corresponding guide wheel 22 and the angle iron 35 are illustrated, but the leaf spring 36 and its mounting bracket 39 are omitted for the purpose of avoiding a multiplicity of broken lines.

Carried by the side walls 31—31 of the extension chute 26 are a pair of brackets 40—40 carrying a pair of electrodes 41—41. The mounting means for each of said electrodes includes a clamp 42 adapted to hold an insulating tube 43 which encloses a rod 44 adapted to be adjustably positioned in the tube 43 by means of clamps 45—45. Each of said rods 44 is adapted to hold an electrode 41 at its lower extremity and to have an electric wire secured to its upper extremity. Said electrodes 41—41 are electrically insulated from their supports and are adapted to be contacted at their lower extremities by electric conductive material, indicated by the numeral 46, within the skip 10. In other words, material of a nature such that it will conduct electricity will complete a circuit across the lower terminals of the electrodes 41—41 when said material reaches a predetermined level. The position of the electrodes 41—41 with respect to the skip 10 is determined by the positioning of leaf spring 36 upon the top of the short wall 20 of the skip 10. If preferred, some other engaging means may be employed whereby the swinging movement of the chute extension 26 is stopped in definite relationship with the skip 10, whereby the position of the electrodes 41—41 is definitely determined with respect to the skip 10 regardless of variations within limits of the position of said skip.

The electrodes 41—41 will be connected to control circuits which need not be illustrated herein. Patent No. 1,946,120, granted February 6, 1934, to the present applicant, fully discloses electrical control mechanism which may be employed in response to the electrodes 41—41 for controlling the electric motor 17 and other mechanism in operating the skip 10.

The mode of operation of the above described embodiment of the present invention need not be described in detail inasmuch as it will be clear from the foregoing description of the instrumentalities involved therein. It may be explained briefly that when the skip 10 is raised from its lowermost position the guide wheel 22 on each side of said skip will engage its corresponding angle iron 35 to swing the chute extension 26 about the axis of the shaft 25 to the position indicated in broken lines in Figure 1. At this time the shut-off gate 32 will stop the flow of material down the chute 24. When the skip 10 is again moved to its lowermost position, that is— to the position illustrated in Figure 1, the roller 22 on each side of the skip 10 will engage the uppermost lamination of the leaf spring 36 and will swing the extension chute 26 toward the position shown in full lines in Figure 1. This movement will move the shut-off gate 32 out of obstructing relationship with the chute 24 and material will be delivered from said chute 24 through the extension chute 26 into the skip 10. When the material 42 reaches a position to complete a circuit across the electrodes 41—41, the motor 17 will be energized to cause said motor 17 to lift the skip 10, moving the shut-off gate 32 into obstructing relationship with the chute 24 and moving the extension chute 26 to the position shown in dotted lines in Figure 1.

Though a preferred embodiment of the present invention has been described in detail, many modifications will occur to those skilled in the art. It is intended to cover all such modifications that fall within the scope of the appended claims.

What is claimed is:

1. In combination, a skip adapted to be positioned in material receiving position with respect to chute means, movable chute means adapted to be positioned to deliver material to said skip and to be moved out of material delivering position, means carried by said skip cooperating with means carried by said chute means for moving said chute means into and out of material delivering position in response to movement of said skip, said skip and said chute means having cooperating means for definitely locating said chute means with respect to said skip regardless of variations, within limits, in the elevation of said skip, and electrode means carried by said chute means adapted to be electrically connected when material in said skip reaches a predetermined level, said electrode means being adapted to complete a motive circuit for raising said skip.

2. In combination, movable chute means adapted to be positioned to receive a supply of material, said chute means including a gate adapted in one position of said chute means to shut off said supply of material, a skip, cooperating guide means upon said chute means and said skip for moving said chute means in response to movement of said skip, said guide means and said skip including cooperating means for definitely locating said guide means relative to said skip regardless of variations, within limits, in the elevation of said skip, electrode means carried by said chute means, said electrode means being adapted to be electrically connected when material in said skip reaches a predetermined level, said electrode means being adapted to complete a motive circuit for raising said skip.

3. In combination, movable chute means adapted to be positioned to receive a supply of material, said chute means including a gate adapted in one position of said chute means to shut off said supply of material, a skip, guide means carried by said chute means, guide roller means carried by said skip and adapted to cooperate with said guide means for swinging said guide means about a predetermined axis as said skip is moved to or from material receiving position, a pair of electrodes, and means for supporting said electrodes from said chute means, said skip and said chute means having cooperating means for definitely locating said chute means relative to said skip regardless of variations, within limits, in the elevation of said skip, said electrode means being adapted to complete a motive circuit for raising said skip.

4. In combination, a main chute, an extension chute rotatably connected thereto, said extension chute having a shut-off gate for closing said main chute when said extension chute is in non-delivery position, a skip tub, guide means carried by said extension chute on each side thereof, said skip having a pair of guide rollers adapted to be engaged by said guide means, said extension chute and said skip being provided with cooperating members for limiting swinging movement of said extension chute relative to said skip, and a pair of electrodes carried by said extension chute, said electrodes being responsive to the volume of material in said skip, said skip and said chute means having cooperating means for definitely locating said chute means relative to said skip regardless of variations, within limits, in the elevation of said skip, said electrode means being adapted to complete a motive circuit for raising said skip.

ARTHUR J. WHITCOMB.

REFERENCES CITED

The following references are of record in the file of this patent:

UNITED STATES PATENTS

| Number | Name | Date |
| --- | --- | --- |
| 1,946,120 | Whitcomb | Feb. 6, 1934 |
| 1,835,094 | Sayers | Dec. 8, 1931 |
| 1,907,089 | Pabst | May 2, 1933 |
| 1,772,696 | Young | Aug. 12, 1930 |